United States Patent [19]

Broden

[11] Patent Number: 4,612,812
[45] Date of Patent: Sep. 23, 1986

[54] STRESS REDUCING STOP FOR UNSTRETCHED PRESSURE SENSING DIAPHRAGM

[75] Inventor: David A. Broden, Chanhassen, Minn.
[73] Assignee: Rosemount Inc., Eden Prairie, Minn.
[21] Appl. No.: 766,123
[22] Filed: Aug. 15, 1985
[51] Int. Cl.$^4$ ............................................. G01L 9/12
[52] U.S. Cl. .................................... 73/718; 92/85 R; 361/283
[58] Field of Search .................. 73/718, 724; 361/283; 92/85 R, 98 R

[56] References Cited

U.S. PATENT DOCUMENTS 3,319,468 5/1967 Baumann .............................. 73/718
3,793,885 2/1974 Frick ................................ 73/398 C
4,370,890 2/1983 Frick .................................... 73/718

Primary Examiner—Donald O. Woodiel
Attorney, Agent, or Firm—Kinney & Lange

[57] ABSTRACT

A sensing cell for sensing pressures which includes a housing and a diaphragm that deflects relative to a housing surface under pressure differentials, the movement of the diaphragm is sensed to provide indications of pressure changes. The diaphragm has a center disc like deflecting portion, an outer peripheral support ring that is clamped for supporting the diaphragm in a housing, and an integral, reduced section web joining the center portion and the support ring. The reduced cross section web causes the diaphragm to act as a free edge diaphragm during deflection. The housing and/or the diaphragm are configured so that at near a rated overpressure stop means support the central disc portion at its annular edge where the web joins the central disc portion to reduce the maximum stress on the web and thus prevent over stressing of the web portion of the diaphragm under maximum overpressures, to reduce hysteresis and innaccuracies.

8 Claims, 4 Drawing Figures

STRESS REDUCING STOP FOR UNSTRETCHED PRESSURE SENSING DIAPHRAGM

BACKGROUND OF THE INVENTION

1. Field of the Invention

The present invention relates to deflecting diaphragm pressure transducers.

2. Description of the Prior Art

U.S. Pat. No. 3,793,885 to Roger L. Frick for a Diaphragm Construction For Differential Pressure Transducer shows a diaphragm that is deflected under pressure and has a central disc deflecting or sensing portion, an outer supporting ring clamped in a housing and an isolation web extending between the support ring for the diaphragm and the central disc deflecting portion. The web is configured to make the center portion of the diaphragm act like a free edge diaphragm by reducing the bending moments of the outer edges where the diaphragm is supported. In particular, the form shown in FIG. 3 of U.S. Pat. No. 3,793,885 has found wide acceptance in the field, and the action of the reduced section web of the diaphragm is reliable and minimizes hysteresis and instability.

Particularly, in relation to differential pressure sensors, the use of the diaphragm deflecting relative to a pressure sensor housing surface, and capacitive sensing of the diaphragm has been found to be useful as has been taught in U.S. Pat. No. 3,793,885. In the sensor, the housing surface that is adjacent to the diaphragm, and toward which the diaphragm deflects, has a concave surface shape conforming across its diameter to the deflected surface shape of the diaphragm under pressure. A thin stationary capacitive plate is formed on the adjacent concave housing surface toward which the diaphragm deflects, as shown in U.S. Pat. No. 3,793,885, is positioned to substantially fully support the diaphragm when the diaphragm is subjected to its maximum rated overpressure, so that overpressures will not destroy or damage the diaphragm. The diaphragm is thus supported fully at its center on the concave stationary capacitor plate and housing surface under such overpressure.

The sensing diaphragm central portion must be sensitive enough to provide useful signals when pressure differentials are only one or two psi, but because the line pressures may be several hundred psi, extremely high overpressures can be experienced. The support for the diaphragm on the housing prevents damage to the diaphragm under such high overpressures.

It has been found that the web portion or reduced thickness portion that connects the outer mounting ring of the diaphragm to the central portion becomes more highly stressed than the central portion of the diaphragm, as pointed out in U.S. Pat. No. 3,793,885. The overall performance of the diaphragm construction shown in U.S. Pat. No. 3,793,855 is considerably improved over a uniform thickness diaphragm due to the isolation of the stresses from the mounting ring and the resulting minimization of hysteresis and instability of the diaphragm.

The present invention improves the performance of the diaphragm construction under field operation further, by controlling and reducing the maximum stress in the web between the outer diaphragm support ring and the center plate. The diaphragm using the web is not stretched or stressed in its rest position.

U.S. Pat. No. 4,370,890 also shows a sensor having a housing configured to support a stretched diaphragm, and also using a concave or recessed surface in the housing to support the diaphragm in deflected position.

SUMMARY OF THE INVENTION

The present invention relates to a sensor configuration providing a stop support between a deflecting, edge supported diaphragm and an adjacent surface of a mounting housing, which stop is slightly inward from the supported edge the diaphragm. The stop is effective before the center sensing portion of the diaphragm is supported under overpressure, to reduce maximum stresses at the outer edge of the diaphragm while permitting additional deflection of the center portion under overpressures. The stop is made so that it will support the peripheral edge of the center portion of the diaphragm after the diaphragm has exceeded its rated operable pressure, but before the center portion is supported under maximum overpressure. The diaphragm operates across its rated pressure range without the stop being operable.

The deflecting diaphragm for sensing pressures preferably has an outer support ring around the periphery thereof, a central plate sensing portion, and a reduced thickness (reduced cross sectional area) web joining the central plate portion and the outer ring to provide a "free edge" diaphragm deflection characteristic. The web is formed by annular grooves at the top and bottom of the diaphragm that reduce the thickness of the diaphragm and which are made in the desired configuration. As shown, the web is tapered so that the web is thicker at the point where it joins the outer support ring, and it tapers down to where it joins the inner portion.

The stop can be formed by configuring the adjacent surface on the housing that mounts the diaphragm to provide a peripheral rib or rim which protrudes toward the diaphragm more than the normal concave (part spherical) surface that is formed to the shape of the deflected diaphragm, to support the peripheral edge of the center plate portion before the center plate portion of the diaphragm contacts the housing. Alternately, an annular stop rib can be formed at the outer edge of the center plate portion of the diaphragm itself, which stop rib will contact the adjacent housing surface when the diaphragm is under slightly more than its rated full scale pressure, and before the center plate portion contacts the aligning housing surface.

Large overpressure excursions thus do not raise the stress in the web, in that the stop isolates the web from bending although the center portion of the diaphragm may deflect more before being fully seated on the housing surface.

DESCRIPTION OF THE PREFERRED EMBODIMENTS

Figure 1:
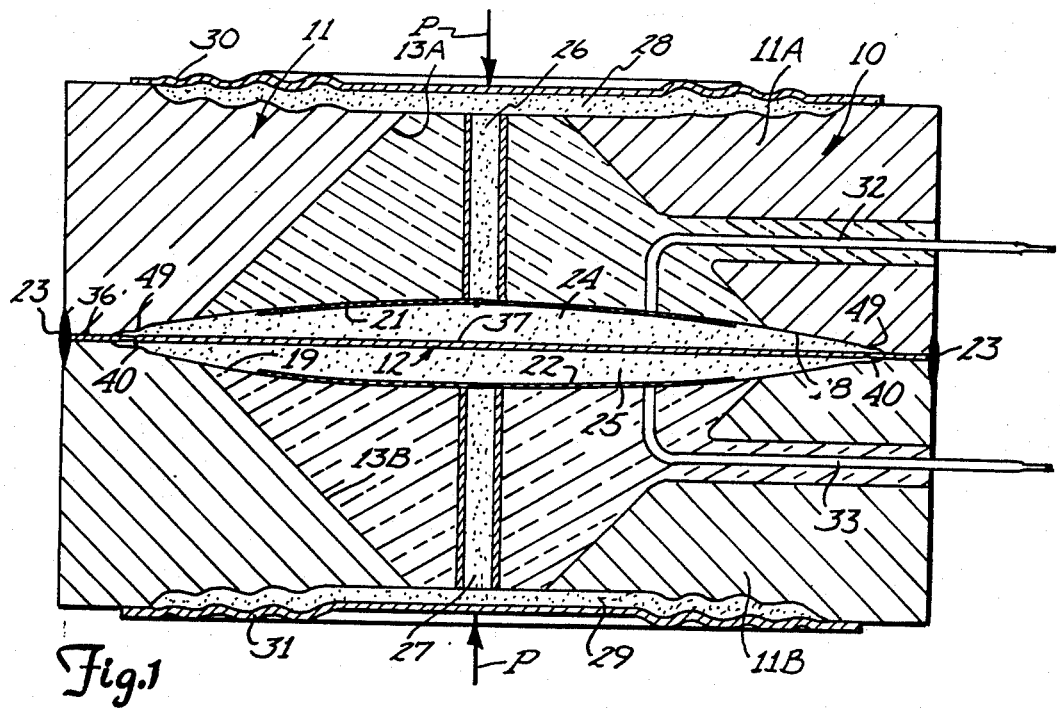
FIG. 1 is a cross sectional view of a typical differential pressure sensor having a deflecting diaphragm therein, and including stop means made according to the present invention.

FIG. 1 shows a sensor construction having a housing similar to that shown in U.S. Pat. No. 3,793,885, in that the present invention is an improvement over that construction. The construction includes a sensing cell 10, which in the disclosed form is a differential pressure sensor, which comprises a large metal housing 11, made into two sections 11A and 11B. The housing sections 11A and 11B are placed together so that they face each other along a parting plane and they are separated by a measuring or sensing diaphragm 12. The housing sections 11A and 11B are metal cups having generally conical cross section cavities, in the form shown, which generally corresponds to the cavities shown in the U.S. Pat. No. 4,370,890. The cavities 13A and 13B are filled with a rigid insulation material such as a glass or ceramic material. The insulation filling of these cavities in fused to the metal walls of the housing sections 11A and 11B. The open ends of the housing sections terminate along planes that are parallel to the diaphragm 12 when the diaphragm is at an undeflected or rest position.

In forming the sensor, the rigid insulation material in the cavities 13 in each of the individual housing sections is ground into a concave surface, opening to the terminating plane. The concave surface is substantially part spherical in the central portions thereof, generally as indicated at 18 and 19, respectively. These concave surfaces 18 and 19 each have a suitable thin metal coating in the central portion forming capacitor plates indicated at 21 and 22, respectively. The diaphragm 12 divides the two cavities in the housing sections to form separated chambers 24 and 25 on opposite sides of the diaphragm 12. When the sensor is an isolated sensor, as shown, the chambers which are formed are filled with a noncompressible fluid, such as a suitable oil.

In the present invention the concave surfaces 18 and 19 are not formed to be part spherical or smoothly contoured all the way to the outer edge of the deflective portion of the diaphragm, in that the surfaces are configured at the outer edges to form stop means. However, the majority of the area of the surfaces 18 and 19 are ground to conform to the deflected shape of the center portion of the diaphragm 12 which is the sensing portion of the diaphragm.

The diaphragm 12 is placed between the housing sections 11A and 11B and is welded into place with a continuous peripheral bead weld 23 which joins the two housing sections 11A and 11B together, and holds the diaphragm 12 in position. The weld 23 also hermetically seals the chambers 24 and 25 on the interior of the housing defined between the surfaces 18 and 19, and thus between the capacitor plates 21 and 22 and the diaphragm 12, respectively. The diaphragm 12 is not stretched or stressed when positioned between the housing sections, but is flat in its centered or rest position.

Each of the chambers 24 and 25 is initially open to the outer ends of the housing section 11A and 11B through central passageways 26 and 27. Tubes forming the passageways 26 and 27 are fused into place in the insulation material in cavities 13, and the passageways 26 and 27 each lead into isolation chambers 28 and 29, respectively, that are enclosed with isolation diaphragms 30 and 31. The isolation diaphragms 30 and 31, as can be seen, cover shallow cavities in the outer ends of the housing sections to enclose the isolation chambers 28 and 29. The outer surfaces of the isolation diaphragms are then open to the fluid pressure to be sensed in a conventional manner. Usually a outer shell will overlie the isolation diaphragms and provide pressure connecting fittings for connection to pressure lines. The pressures are represented by the arrows P.

Separate metal tubes indicated at 32 and 33, respectively, are provided in the rigid insulation material and lead to the exterior of the housing sections, as shown, to provide conduits for filling the chambers 24 and 25, the connected passageways 26 and 27 and the isolation chambers 28 and 29 with the noncompressible fluid, after which the tubes 32 and 33 are sealed off. The metal tubes 32 and 33 are used for electrical leads, in that they are electrically connected to the respective capacitor plates 21 and 22. This also is conventional.

As shown, the diaphragm 12 is made up of an annular outer support ring 36, and a central disc like deflecting plate sensing portion 37. The central plate sensing portion 37 and the support ring 36 have a desired thickness, and the support ring 36 is welded with the weld 23, and is positioned and held between the housing sections 11A and 11B. The support ring 36 can be clamped into position or otherwise held, as desired.

The central plate portion 37 has a circular periphery as shown, and is joined to the support ring by a peripheral web indicated generally at 40, which is reduced in average thickness from the thickness of the support ring 36 and central plate portion 37. The web 40 extends for a radial distance that is selected to permit the deflection of the central plate portion 37 in the same manner as a "free edge" diaphragm as explained in U.S. Pat. No. 3,793,885.

Figure 3:
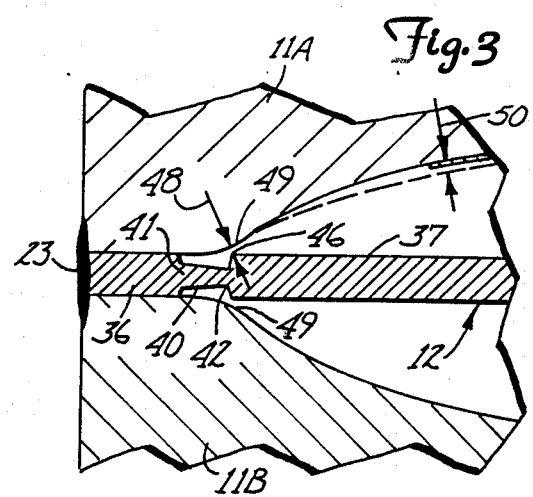
FIG. 3 is an enlarged fragmentary part schematic sectional view showing a first form of the stop means made according to the present invention.

As shown in FIG. 3, the web 40 has a trapezoidal (tapered) cross sectional shape, having a wider base end indicated at 41 which is integral with the inner surface of the support ring 36, and a narrow inner annular end 42 that is integral with the edge surface of the central plate portion 37. The web thickness at base 41 has a maximum thickness and the web tapers to a minimum thickness where it joins the central plate portion 37. The thickness of the web is selected in relation to the length of the web, that is the radial length, to provide flexion characteristics that evenly distributes the bending stresses along the radial length of the web and permits free edge flexion characteristics of the central plate portion 37.

It should also be noted, as disclosed in U.S. Pat. No. 3,793,885, the web 40 can be of a reduced, uniform thickness between the outer support ring 36 and the central plate portion 37 of the diaphragm. The central plate portion 37 is the active capacitor sensing plate and it will deflect in a shape conforming to the center portions of surfaces 18 and 19 and capacitor plates 21 and 22. There will be bending stresses at the edge of the central plate portion 36 much like in a free edge diaphragm. A free edge diaphragm is characterized by having zero radial bending moments at its edge. This, again, reduces hysteresis and increases the stability of the diaphragm and makes it operable reliably.

Figure 2:
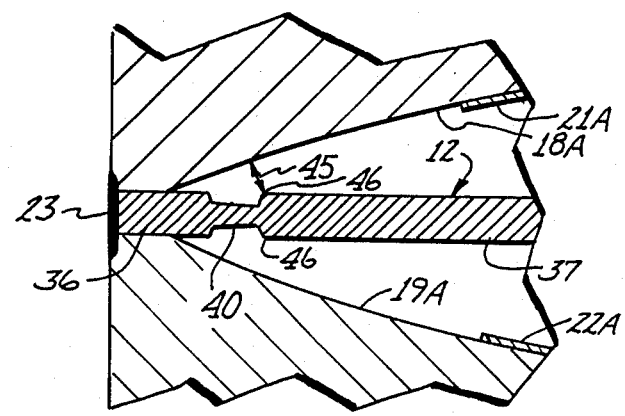
FIG. 2 is an enlarged fragmentary part schematic view of a prior art diaphragm construction such as that shown in U.S. Pat. No. 3,793,885.

FIG. 2 illustrates in an enlarged view the prior art diaphragm and housing construction, as shown in U.S. Pat. No. 3,793,885, and indicates general part spherical surfaces 18A and 19A which extend all the way to the parting planes (open end planes) of the housing sections. The diaphragm 12 is constructed as previously disclosed. At the location indicated at 45 by an arrow, it can be seen that the surfaces 18A and 19A provide substantial space between the corner 46 at the outer peripheral edge of the central plate portion 37 of the diaphragm 12, where the central plate portion 37 joins the web 40. In the prior art system, the corner 46 would contact the surface at dimension 45 at substantially the same time that the surface of the central plate portion 37 contacted the central part of the capacitor plate 21A formed on surface 18A or 19A under overpressure excursions. This was at diaphragm deflection caused by approximately two times the rated full scale differential pressure causing the deflection. The configuration allowed a large bending moment on the reduced web section 40, which would contribute to hysteresis, or in other words contribute to undesired diaphragm performance where the diaphragm would not return to a zero position after the overpressure was removed.

In order to isolate the web between the support ring and the central plate portion from an overpressure loading of double its normal rated load, but yet provide for the full seating of the diaphragm central plate sensing portion 37 against the surface of the capacitor plate 21 or 22, a first form of the invention shown in FIG. 3, at the dimensional location 48, shows that the housing surface indicated at 49 forms a stop peripheral rim or ridge that bulges outwardly to be closer to the corner 46 of the central plate portion 37, where it joins the web 40, than the normal part spherical surface 18A or 19A shown in FIG. 2. Thus, the space at dimension 48 between the corner 46 of the central plate portion 37 of the diaphragm 12 and the aligning interior adjacent stop rim 49 on the surface of the housing is less than that shown in the prior art, and forms stop means in connection with the corner 46 to provide contact on the corner 46 prior to the time that the majority of the surface of central plate portion 37 has contacted the capacitor plate 21 or 22, (and thus surfaces 18 and 19) respectively.

The dotted line representation of the central plate portion 37 in FIG. 3 illustrates the spaced condition of the central plate portion 37 when the corner 46 is stopped. The dimension 50 indicates that the sensing surface of the central plate portion 37 (adjacent the central axis) is still slightly spaced from the capacitor plate 21 on surface 18 when the corner 46 contacts the stop rim 49 that is shown at the location of dimension 48. The stop rim 49 on the housing surface is an annular rim, and is formed on both of the housing cavity surfaces 18 and 19 adjacent the peripheral edge of the central plate portion 37 and in line with the edge 46 thereof where the central plate portion 37 joins web 40.

Figure 4:
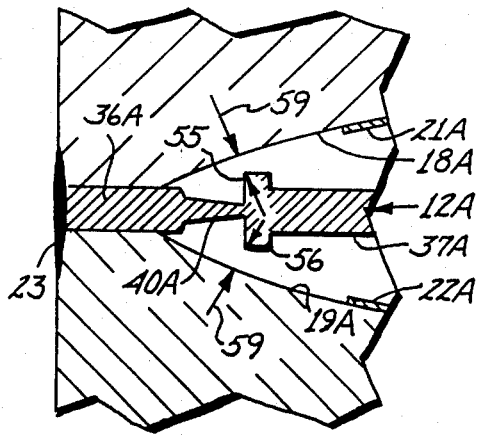
FIG. 4 is an enlarged fragmentary part schematic sectional view similar to FIG. 3 showing a second form of the stop means of the present invention.

A modified form of the invention is shown in FIG. 4, wherein the diaphragm 12A is illustrated having a central sensing portion 37A, an outer support ring 36A and a web 40A that joins the central plate portion 37A and the mounting ring 36A. The dimensions of the web 40A and the thickness of the diaphragm 12A itself can be the same as shown in FIG. 3, but in this form of the invention the diaphragm 12A is formed with a raised edge rib 55 on one side of the center plate portion 37A, and a raised edge rib 56 on the other side of the central plate portion 37A adjacent to the web 40A. The rib 55 is a peripheral rib extending around the edge of diaphragm central plate portion 37A. The surface 18A of the housing section shown in FIG. 4 and surface 19A of the housing section on the lower portion of the diaphragm 12A are formed as in the prior art sensor shown in FIG. 2, that is with a countinous, smoothly contoured, generally part spherical surface extending all the way out to the outer end plane at the parting plane of the housing sections. Thus, where the dimension 59 is shown, the rib 55 will contact the surface 18A prior to the time that the center of the central plate portion 37A contacts the capacitor plate 21A on surface 15A that is shown in FIG. 4.

The height of the ribs or rims 55 and 56 is exaggerated in the drawings, so that they can be seen clearly, but only a very small raised peripheral rim around the central plate sensing portion 37A of the diaphragm will provide the stop menas in combination with the housing surface 18A or 19A.

The stop means provides contact to stop deflecting movement the outer peripheral edge of the central plate sensing portion 37 or 37A after approximately 120 percent of the rated full scale differential pressure is applied, as opposed to approximately 200 percent of the rated differential pressure when the central plate sensing portion surface contacts the respective adjacent housing surface.

In the forms of the invention shown, again, the web 40 or 40A can be any desired configuration, such as a uniform thickness web, as well as the tapered web as shown in the preferred embodiment.

The diaphragms normally are made of a suitable metal such as Nispan-C, which is a high-strength alloy material, as was disclosed in the prior art.

The stop means support the diaphragm at a deflection less than the desired maximum overload deflection of the central plate portion of the diaphragm. The extra spacing left between the diaphragm and the capacitor plate when the stop supports the diaphragm (at 120 percent of rated pressure) is needed to provide accurate operation over the nominal pressure range. The transducer becomes non-linear when the diaphragm and capacitor plate spacing is very small. Also, it is desirable to have an increasing output as overpressure increases up to 200 percent of rated pressure so that the sensed capacitance is at least somewhat representative of the magnitude of the overpressure. Also, the greater space in the center of the surfaces 18 and 19 accommodates manufacturing variations. The ribs 49 in the housings do not have a sensing capacitor plate on them and thus do not affect the output indications. Also the ribs 49 are adjacent the open ends of the housing section where they are accessible during manufacturing operations. Under repeated overpressure conditions, the stress reduction provided by the stop means reduces fatigue in the diaphragm and extends the useful life of the sensor.

What is claimed is:

1. In a pressure transducer having a housing, said housing having a recessed surface defining a reference surface, a diaphragm mounted on said housing to be deflected under pressure toward said reference surface, means to sense deflection of said diaphragm under pressure, the diaphragm comprising a central plate sensing portion, a peripheral mounting ring fixedly mounted on said housing and surrounding said central plate sensing portion, and a web portion of reduced thickness extending between the ring and central portion and joined to the ring and to the edge of the central plate portion, whereby the central plate portion can deflect toward the reference surface relative to the ring under pressure, the improvement comprising the reference surface being formed generally to conform to the deflection of the central plate sensing portion to fully support the central plate sensing portion under a first high overpressure as the central plate sensing portion deflects, and stop means for stopping deflection of the outer peripheral edge of the central plate sensing portion relative to the housing adjacent the junction of the web and said central plate sensing portion prior to the time that other portions of the central plate sensing portion of the diaphragm contact said reference surface.

2. The apparatus of claim 1 wherein said stop means comprises a substantially annular rib formed on the reference surface adjacent the outer periphery thereof in alignment with the outer peripheral edge of the central plate sensing portion of the diaphragm, said rib extending toward said central sensing portion a selected amount which is greater than a smooth continuation of the reference surface bounded by the rib.

3. The apparatus as specified in claim 1 wherein said stop means comprises a rib portion raised from the plane of the central plate sensing portion of the diaphragm at the outer peripheral edge of the central plate sensing portion, to contact the reference surface prior to the center of the central plate sensing portion contacting the reference surface under overpressure loading.

4. The apparatus as specified in claim 1 wherein said housing has two portions to form two cavities on opposite sides of the diaphragm, and wherein said stop means are formed on both portions of said housing forming said cavities on opposite sides of the diaphragm.

5. A capacitive pressure transducer for providing a capacitive signal representative of applied pressure comprising:
a diaphragm mounted for deflection by the applied pressure having a central plate portion having first and second sides forming a first capacitor plate, a peripheral mounting ring surrounding the central plate portion and a web portion thinner than the central plate portion, said web portion extending between the ring and central plate portion and joined to the ring and the central plate portion;
a second capacitor plate mounted in a fixed relationship with respect to the peripheral mounting ring, said second capacitor plate being spaced from the first side of the central plate portion and having a shape conforming generally to a first deflected position of the central plate portion; and
first stop means for limiting the deflection of the outer peripheral edge of the central plate at a second deflected position, said second deflected position being at less deflection of the central plate portion than said first deflected position.

6. A capacitive pressure transducer as recited in claim 5 further comprising:
a third capacitor plate mounted in a fixed relationship with respect to the peripheral mounting ring, said third capacitor plate being spaced from the second side of the central plate portion and having a shape conforming generally to a third deflected position of the central plate portion; and
second stop means for limiting the deflection of the outer peripheral edge of the central plate portion at a fourth deflected position of the central plate portion, said fourth deflected position being at less deflection of the central plate portion than said third deflected position.

7. A capacitive pressure transducer as recited in claim 5 wherein said first stop means comprises an annular rib portion on the outer peripheral edge of the central plate portion and a reference surface fixedly mounted to the mounting ring for engaging the annular rib at the second deflected position.

8. A capacitive pressure transducer as recited in clam 5 wherein said first stop means comprises an annular rib fixedly mounted with respect to the mounting ring for engaging the outer peripheral edge of the central plate at the second deflected position.

* * * * *